(12) United States Patent
Kim et al.

(10) Patent No.: US 12,147,343 B2
(45) Date of Patent: Nov. 19, 2024

(54) MULTIPROCESSOR SYSTEM AND DATA MANAGEMENT METHOD THEREOF

(71) Applicant: METISX CO., LTD., Yongin-si (KR)

(72) Inventors: Do Hun Kim, Yongin-si (KR);
Keebum Shin, Seongnam-si (KR);
Kwangsun Lee, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/507,836

(22) Filed: Nov. 13, 2023

(65) Prior Publication Data
US 2024/0354250 A1  Oct. 24, 2024

(30) Foreign Application Priority Data

Apr. 19, 2023 (KR) .......................... 10-2023-0051369

(51) Int. Cl.
*G06F 12/0811* (2016.01)
*G06F 9/30* (2018.01)

(52) U.S. Cl.
CPC ...... *G06F 12/0811* (2013.01); *G06F 9/30043* (2013.01)

(58) Field of Classification Search
CPC .............. G06F 12/0811; G06F 12/0815; G06F 12/0842; G06F 12/0862; G06F 12/0806; G06F 12/0891; G06F 9/30043; G06F 12/0846; G06F 2212/282
USPC ....................................................... 711/122
See application file for complete search history.

(56) References Cited

U.S. PATENT DOCUMENTS

| | | | |
|---|---|---|---|
| 10,339,023 B2* | 7/2019 | Wang | G06F 1/3206 |
| 2002/0065980 A1* | 5/2002 | Lasserre | G06F 12/0891 |
| | | | 711/3 |
| 2014/0189411 A1* | 7/2014 | Kanchana | G06F 1/3275 |
| | | | 713/324 |
| 2016/0210231 A1* | 7/2016 | Huang | G06F 12/0811 |
| 2019/0095204 A1* | 3/2019 | Zbiciak | G06F 9/383 |

(Continued)

FOREIGN PATENT DOCUMENTS

| | | |
|---|---|---|
| KR | 10-0294105 B1 | 9/2001 |
| KR | 10-2004-0106472 A | 12/2004 |

(Continued)

OTHER PUBLICATIONS

Korean Office Action for Korean Application No. 10-2023-0051369 dated Jul. 31, 2023, 6 pages.

*Primary Examiner* — Hashem Farrokh
(74) *Attorney, Agent, or Firm* — Sughrue Mion, PLLC

(57) ABSTRACT

A multiprocessor system may include a plurality of processors including a first processor and a second processor; a first cache memory corresponding to the first processor; a second cache memory corresponding to the first processor and the second processor and storing a plurality of cache lines; and a controller manages data stored in the second cache memory. The second cache memory includes at least one first cache line in which data is written by the first processor and at least one second cache line in which data is written by the second processor. The controller: receives a command associated with a data update from the first processor, and in response to the command, sets the first cache line as a clean cache line or an invalidated cache line while not setting the second cache line as a clean cache line or an invalidated cache line.

15 Claims, 7 Drawing Sheets

(56) References Cited

U.S. PATENT DOCUMENTS

| | | | | |
|---|---|---|---|---|
| 2019/0155736 A1* | 5/2019 | Hagersten | ............ | G06F 12/0811 |
| 2022/0358037 A1* | 11/2022 | Favor | ................. | G06F 12/0871 |
| 2023/0231811 A1* | 7/2023 | Dalal | ................. | G06F 13/4022 |
| | | | | 710/308 |

FOREIGN PATENT DOCUMENTS

| | | |
|---|---|---|
| KR | 10-0851738 B1 | 8/2008 |
| KR | 10-2012-0018100 A | 2/2012 |
| KR | 10-1639943 B1 | 7/2016 |
| KR | 10-1711945 B1 | 3/2017 |
| KR | 10-1747894 B1 | 6/2017 |
| KR | 10-2019-0058317 A | 5/2019 |

* cited by examiner

| Processor ID | Address | Data | Flag |
|---|---|---|---|
| 110a | ADDR7 | X | DTY |
| 110a | ADDR8 | Z | DTY |
| 110b | ADDR9 | Y | DTY |

410

| Processor ID | Address | Data | Flag |
|---|---|---|---|
| 110a | ADDR7 | X | CLN |
| 110a | ADDR8 | Z | CLN |
| 110b | ADDR9 | Y | DTY |

| Region | Processor ID | Address | Data | Flag |
|---|---|---|---|---|
| A1 | 110a | ADDR7 | X1 | DTY |
| A1 | 110a | ADDR8 | X2 | DTY |
| A2 | 110b | ADDR9 | Y1 | DTY |
| A2 | 110b | ADDR10 | Y2 | DTY |
| A3 | 110a | ADDR11 | Z1 | DTY |
| A3 | 110b | ADDR12 | Z2 | DTY |

610

601, 602, 603, 604, 605, 606

| Region | Processor ID | Address | Data | Flag |
|---|---|---|---|---|
| A1 | 110a | ADDR7 | X1 | CLN |
| A1 | 110a | ADDR8 | X2 | CLN |
| A2 | 110b | ADDR9 | Y1 | DTY |
| A2 | 110b | ADDR10 | Y2 | DTY |
| A3 | 110a | ADDR11 | Z1 | CLN |
| A3 | 110b | ADDR12 | Z2 | CLN |

MULTIPROCESSOR SYSTEM AND DATA MANAGEMENT METHOD THEREOF

CROSS-REFERENCE TO RELATED APPLICATION

This application claims priority under 35 U.S.C § 119 to Korean Patent Application No. 10-2023-0051369, filed on Apr. 19, 2023, in the Korean Intellectual Property Office, the entire contents of which is hereby incorporated by reference.

TECHNICAL FIELD

The present disclosure relates to a multiprocessor system and a data management method thereof.

BACKGROUND

The cache memory in computing systems may consist of several levels. For example, it may be composed of levels such as L1, L2, and L3 (or L0, L1, and L2) in order of proximity to the CPU. Each cache memory can be designed by selecting a write-back method or a write-through method depending on the application. In many cases, it can be designed in the write-back method, which is known to perform well.

In general, the L1 cache is used exclusively by a single CPU, while the L2 and L3 caches are used by multiple CPUs in common. When multiple CPUs share the same memory region, cache coherency can be problematic. Host computers can usually overcome this problem by providing cache coherency interconnect technology on the hardware level. In comparison, for example, embedded SoC architectures rely on software instructions such as a flush command or invalidate command to achieve cache coherency. However, a flush command or an invalidate command for the existing L2 cache or L3 cache is processed to globally flush or globally invalidate all cache lines. In this case, there is a disadvantage in that the time to process the flush command may be prolonged. Further, the invalidate command invalidates all the cache lines, which can cause system performance degradation.

SUMMARY

It is a technical object of the present disclosure to provide a mechanism that optimizes the performance of a cache memory.

It is a technical object of the present disclosure to provide an efficient cache operating mechanism that minimizes the time and resources required to maintain cache coherency without affecting system performance.

It is a technical object of the present disclosure to shorten the time to process a flush request.

It is a technical object of the present disclosure to minimize performance degradation due to cache misses.

It is a technical object of the present disclosure to provide a mechanism capable of maximizing system performance when CPUs sharing a cache use a memory region exclusively.

It is a technical object of the present disclosure to provide a mechanism capable of avoiding a global flush.

The present disclosure may be implemented in a variety of ways, including devices, systems, methods, or computer programs stored on a readable storage medium.

As one aspect of the present disclosure, a multiprocessor system is disclosed. The system may include: a plurality of processors including a first processor and a second processor; a first cache memory configured to correspond to the first processor; a second cache memory being at a level different from the first cache memory, corresponding to the first processor and the second processor, and configured to store a plurality of cache lines; and a controller configured to manage data stored in the second cache memory, wherein the second cache memory includes at least one first cache line in which data is written by the first processor and at least one second cache line in which data is written by the second processor, and wherein the controller is further configured to: receive a command associated with a data update from the first processor, and in response to the command, set the first cache line as a clean cache line or an invalidated cache line while not setting the second cache line as a clean cache line or an invalidated cache line.

According to another aspect of the present disclosure, a data management method for a system including a first processor, a second processor, a first cache memory configured to correspond to the first processor, and a second cache memory being at a level different from the first cache memory and corresponding to the first processor and the second processor is disclosed. The data management method may include: writing data to a first cache line of the second cache memory by the first processor; writing data to a second cache line of the second cache memory by the second processor; receiving a command associated with a data update from the first processor; and in response to the command, setting the first cache line as a clean cache line or an invalidated cache line while not setting the second cache line as a clean cache line or an invalidated cache line.

According to various embodiments of the present disclosure, it is possible to provide a multiprocessor system in which the performance of a cache memory is optimized and a data management method thereof.

According to various embodiments of the present disclosure, a cache memory can be operated efficiently by minimizing the time and resources required to maintain cache coherency without affecting system performance.

According to various embodiments of the present disclosure, a flush time can be shortened as a flush operation occurs selectively only for cache lines corresponding to processor IDs requiring flushing.

According to various embodiments of the present disclosure, performance degradation due to cache misses can be minimized as an invalidate operation occurs selectively only for cache lines corresponding to processor IDs that require invalidation without invalidating all cache lines.

According to various embodiments of the present disclosure, system performance can be maximized as a plurality of processors sharing a cache memory uses a memory region exclusively.

According to various embodiments of the present disclosure, system performance can be improved by avoiding a global flush even in a situation where a flush for a memory region shared by a plurality of processors is required.

The effects of the present disclosure are not limited to those mentioned above, and other effects that have not been mentioned will be clearly understood by those of ordinary skill in the art to which the present disclosure pertains (hereinafter referred to as a 'person of ordinary skill') from the description of the claims.

BRIEF DESCRIPTION OF THE DRAWINGS

FIG. 4 is a view illustratively showing a process in which a command associated with a data update in a cache memory is processed according to the embodiment related to FIG. 3;

FIG. 6 is a view illustratively showing a process in which a command associated with a data update in a cache memory is processed according to the embodiment related to FIG. 5.

DETAILED DESCRIPTION OF THE PREFERRED EMBODIMENTS

Figure 1:
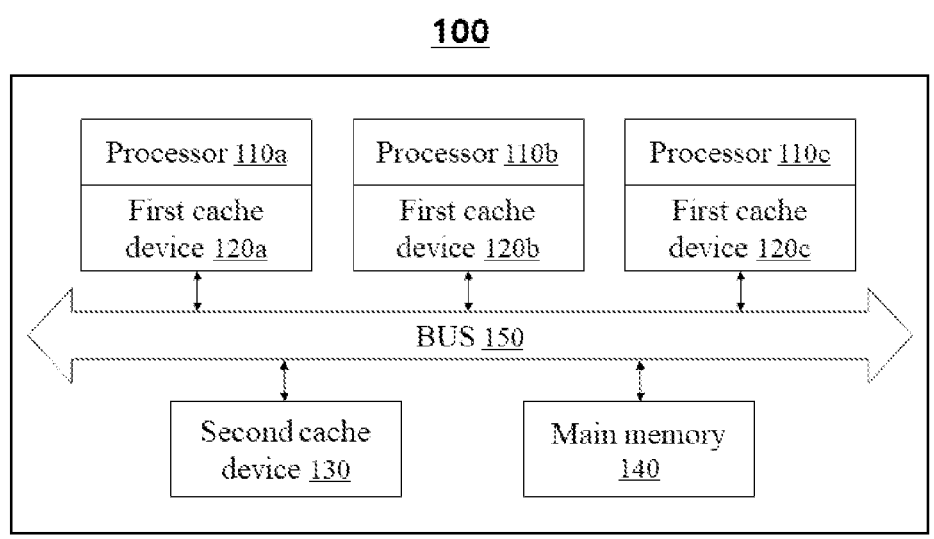
FIG. 1 is a block diagram of a multiprocessor system in accordance with one embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Figure 2:
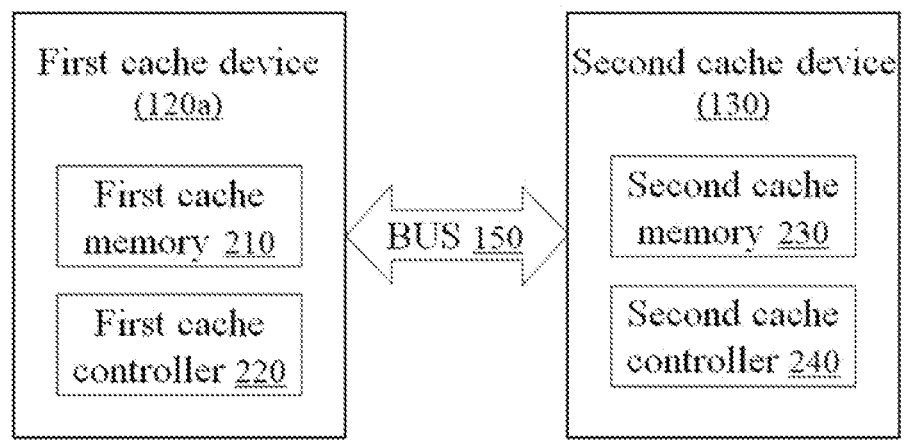
FIG. 2 is a block diagram of a first cache device and a second cache device in accordance with one embodiment of the present disclosure.

FIG. 1 is a block diagram of a multiprocessor system 100 in accordance with one embodiment of the present disclosure. In addition, FIG. 2 is a block diagram of a first cache device and a second cache device in accordance with one embodiment of the present disclosure.

The multiprocessor system 100 may be associated with a server, a user terminal, a personal computer, a portable computer, and the like. The multiprocessor system 100 may include a plurality of processors 110a, 110b, and 110c. The plurality of processors 110a, 110b, and 110c may be x86 CPUs, ARMs, RISC-Vs, and the like. Further, the plurality of processors 110a, 110b, and 110c may be domain-specific architecture (DSA) processors designed for the purpose of driving particular applications more efficiently.

The multiprocessor system 100 may include cache devices of multiple levels. For example, a high-level cache device that is relatively closer to the processors 110a, 110b, and 110c, small, and fast, and a low-level cache device that is relatively closer to the main memory 140, large, and slow may be included. As shown in FIG. 1, the multiprocessor system 100 may include first cache devices 120a, 120b, and 120c as high-level cache devices, and a second cache device 130 as a low-level cache device. Each of the first cache devices 120a, 120b, and 120c and the second cache device may include a cache memory and a cache controller. As shown in FIG. 2, the first cache device 120a may include a first cache memory 210 and a first cache controller 220, and the second cache device 130 may include a second cache memory 230 and a second cache controller 240.

The multiprocessor system 100 in accordance with the present disclosure may be a system in which the respective processors 110a, 110b, and 110c are assigned the first cache devices 120a. 120b, and 120c as their first-level private cache (i.e., L1 cache). The cache memory of the first cache devices 120a, 120b, and 120c may be a memory in which the space for data units can respond only to the activities of the processors 110a, 110b, and 110c corresponding to the relevant cache devices 120a, 120b, and 120c. In other words, the first cache memory 210 may correspond to the processor 110a. The first cache memory 210 may store a plurality of cache lines.

The second cache device 130 is at a level different from the first cache devices 120a. 120b, and 120c, and may correspond to the plurality of processors 110a, 110b, and 110c. In the present disclosure, the first cache memory 210 may be described as being at a 'higher level' relative to the second cache memory 230, and the second cache memory 230 may be described as being at a 'lower level' relative to the first cache memory 210. The second cache memory 230 may include data and commands shared by the plurality of processors 110a, 110b, and 110c and accessed by the plurality of processors 110a, 110b, and 110c. The second cache memory 230 may be a global cache since the space for data units may be formed in response to the activity of any of the processors 110a, 110b, and 110c. Further, the first cache memory 210 may have its own duplicate copy, whereas the second cache memory 230 may be a shared cache in that each data unit may only exist as one shared copy. The second cache memory 230 may store a plurality of cache lines.

The multiprocessor system 100 may include a main memory 140. The main memory 140 may store commands and data accessed by the plurality of processors 110a, 110b, and 110c. The main memory 140 may be, for example, a DIMM-type DRAM.

The multiprocessor system 100 may include a bus 150. The bus 150 may provide a communication function between components of the multiprocessor system 100. The bus 150 may be implemented as various types of buses, such as an address bus, a data bus, and a control bus.

FIGS. 1 and 2 illustrate components related to the description of embodiments of the present disclosure. Accordingly, those of ordinary skill in the art to which the present disclosure pertains will appreciate that other generic-purpose components may be further included in addition to the components shown in FIGS. 1 and 2. For example, the multiprocessor system 100 may further include one or more secondary storage devices (e.g., SSDs, HDDs), communication interfaces, additional cache memories at different levels, and the like, and the first cache devices 120a. 120b, and 120c and the second cache device 130 may further include a scheduler and the like.

FIG. 2 illustrates that the first cache controller 220 is included in the first cache device 120a and the second cache controller 240 is included in the second cache device 130. However, the present disclosure is not limited to such an embodiment, and the first cache controller 220 and the second cache controller 240 may be implemented externally to the first cache device 120a and the second cache device 130, respectively. Further, in the present disclosure, at least some functions of the first cache controller 220 and the second cache controller 240 can also be integrated and implemented.

Figure 3:
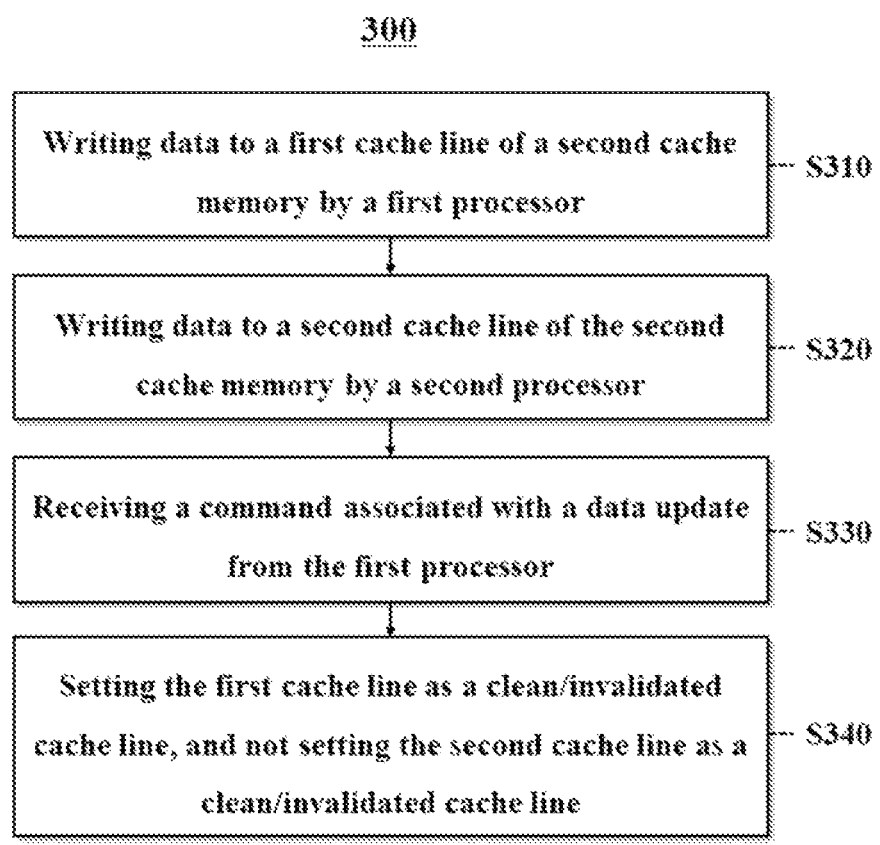
FIG. 3 is a flowchart illustrating a data management method in a multiprocessor system in accordance with one embodiment of the present disclosure.

FIG. 3 is a flowchart 300 illustrating a data management method in a multiprocessor system 100 in accordance with one embodiment of the present disclosure. According to one embodiment, the steps illustrated in FIG. 3 may be executed by the plurality of processors 110a, 110b, and 110c and the second cache controller 240.

Data may be written to a first cache line of the second cache memory 230 by the first processor (S310). According to one embodiment, data may be written to the first cache line of the second cache memory 230 by a request associated with a data access of the processor 110a. For example, when the processor 110a has issued a read request for data 'X' and a cache miss has occurred in the first cache memory 210 and the second cache memory 230 of the first cache device 120a, data 'X' may be loaded from the main memory 140 or from a cache memory at a lower level than the second cache memory 230 and be written to the second cache memory 230. The second cache controller 240 may allocate a first cache line, which is one of a plurality of cache lines of the second cache memory 230, for storage of data 'X'. Further, the second cache controller 240 may write the ID of the processor 110a to the cache tag of the first cache line.

Data may be written to a second cache line of the second cache memory 230 by the second processor (S320). According to one embodiment, data may be written to the second cache line of the second cache memory 230 by a request associated with a data access of the processor 110b. For example, when the processor 110b has issued a read request for data 'Y' and a cache miss has occurred in the first cache memory and the second cache memory 230 of the first cache device 120*b*, data 'Y' may be loaded from the main memory 140 or from a cache memory at a lower level than the second cache memory 230 and be written to the second cache memory 230. The second cache controller 240 may allocate a second cache line, which is one of the plurality of cache lines of the second cache memory 230, for storage of data 'Y'. Further, the second cache controller 240 may write the ID of the processor 110*b* to the cache tag of the second cache line.

A command (or request) associated with a data update may be received from the first processor (S330). According to one embodiment, the processor 110*a* may issue a command associated with a data update. The command associated with a data update may be a partial flush command or a partial invalidate command. Here, the term "partial flush command" or "partial invalidate command" may be what is distinguished from a global flush command or a global invalidate command in the command itself. However, the present disclosure is not limited thereto, and even if the command itself is identical to a normal flush command or invalidate command, it may be a concept including a command to be processed if it is differentiated from the processing procedure in the typical global flush command or global invalidate command. For example, a command to which a processing method by the second cache controller 240 and the multiprocessor system 100 including the same in accordance with the present disclosure is applied may be referred to as a partial flush command or a partial invalidate command.

The first cache controller 220 of the first cache device 120*a* and/or the second cache controller 240 of the second cache device 130 may receive the command. The second cache controller 240 may process the command in the next step (S340). Although a specific description is omitted in this embodiment, the first cache controller 220 may process the command in the first cache memory 210.

While the first cache line may be set as a clean cache line or an invalidated cache line, the second cache line may not be set as a clean cache line or an invalidated cache line (S340). The second cache controller 240 may process the command associated with a data update from the processor 110*a*. According to one embodiment, if the command is a partial flush command, the second cache controller 240 may set the first cache line as a clean cache line while not changing the second cache line. In other words, the second cache controller 240 may not set the second cache line as a clean cache line. According to one embodiment, if the command is a partial invalidate command, the second cache controller 240 may set the first cache line as an invalidated cache line while not changing the second cache line. In other words, the second cache controller 240 may not set the second cache line as an invalidated cache line.

FIG. 4 is a view 400 illustratively showing a process in which a command associated with a data update in a cache memory is processed according to the embodiment related to FIG. 3.

In a first state 410, data are written to the plurality of cache lines of the second cache memory 230 by the plurality of processors 110*a* and 110*b*. Data 'X' and 'Z' are written to the cache lines 402 and 404, respectively, by the processor 110*a*, and data 'Y' is written to the cache line 406 by the processor 110*b*. It is assumed that these cache lines 402, 404 and 406 are set as dirty cache lines.

The second cache controller 240 in accordance with the present disclosure may write the ID of the processor associated with the writing of the data to the cache tag of the cache line. The second cache controller 240 may write the ID of the processor 110*a* to the cache tags of the cache lines 402 and 404 and write the ID of the processor 110*b* to the cache tag of the cache line 406. In the first state 410, the second cache controller 240 may receive a command associated with a data update from the processor 110*a*.

According to the embodiment of FIG. 4, the second cache controller 240 receives a partial flush command 430 from the processor 110*a*. The second cache controller 240 may identify the cache lines 402 and 404 in which the ID of the processor 110*a* is written to the cache tags among the plurality of cache lines of the second cache memory 230 in response to the partial flush command 430, and selectively set the identified cache lines 402 and 404 as clean cache lines. At this time, the second cache controller 240 may not set the cache line 406, to which the ID of the other processor that does not correspond to the partial flush command 430, e.g., the processor 110*b*, is written, as a clean cache line but keep it as the dirty cache line. Through this processing, the second cache memory 230 may change from the first state 410 to a second state 420. In the second state 420, the cache line 402 and cache line 404 are set as clean cache lines, and the cache line 406 remains unchanged as the dirty cache line.

According to an embodiment different from that of FIG. 4, the second cache controller 240 may receive a partial invalidate command from the processor 110*a*. The second cache controller 240 may identify a cache line in which the ID of the processor 110*a* is written to the cache tag among the plurality of cache lines of the second cache memory 230 in response to the partial invalidate command, and selectively set the identified cache line as an invalidated cache line. At this time, the second cache controller 240 may not set the cache line, to which the ID of the other processor that does not correspond to the partial invalidate command, e.g., the processor 110*b*, is written, as an invalidated cache line but keep it as the dirty cache line.

According to yet another embodiment, the second cache controller 240 may receive a partial flush command from the processor 110*b*. The second cache controller 240 may identify a cache line in which the ID of the processor 110*b* is written to the cache tag among the plurality of cache lines of the second cache memory 230, e.g., the cache line 406 of FIG. 4, in response to the partial flush command, and selectively set the identified cache line as a clean cache line. At this time, the second cache controller 240 may not set the cache lines 402 and 404, to which the ID of the other processor that does not correspond to the partial flush command, e.g., the processor 110*a*, is written, as clean cache lines but keep them as the dirty cache lines.

The second cache controller 240 in accordance with the present disclosure may manage a tag table to which a cache tag for each of the plurality of cache lines of the cache memory is written. The tag table may include processor ID information associated with the written data. In addition, the tag table may further include at least one of addresses and flags associated with the written data. For example, the tag table may include some of the information shown in the first state 410 and the second state 420. The second cache controller 240 may determine a cache line corresponding to the processor that has transferred the command associated with a data update out of the plurality of cache lines of the second cache memory 230 based on the tag table, and set the determined cache line as a clean cache line or an invalidated cache line.

A second cache controller in accordance with a comparative example may receive a flush command or an invalidate command that is a command associated with a data update from the processor, and set all cache lines of the second cache memory as clean cache lines or invalidated cache lines in response to the command. In the case of a flush command, the range of a memory region to which the flush command is applied is widened, and flush processing may be performed to an unnecessary range, and accordingly, unnecessary consumption of processing resources and delays in processing time may be caused. Further, in the case of an invalidate command, the range of a memory region to which the invalidate command is applied is widened, and invalidation processing may be performed to an unnecessary range, and accordingly, cache misses may occur even for unnecessary data.

On the other hand, the second cache controller 240 in accordance with the present disclosure may receive a flush command or an invalidate command that is a command associated with a data update from the processor, selectively set a cache line associated with the command out of the cache lines of the second cache memory 230 as a clean cache line or an invalidated cache line, and keep the rest of the cache lines as they are. With this characteristic configuration, the range of a memory region to which the flush command or the invalidate command is applied can get narrower relatively. Accordingly, it is possible to prevent unnecessary consumption of processing resources and delays in processing time due to additional flush processing, and prevent cache misses from occurring due to additional invalidation processing. As a result, the overall performance of the multiprocessor system 100 can be improved.

Figure 5:
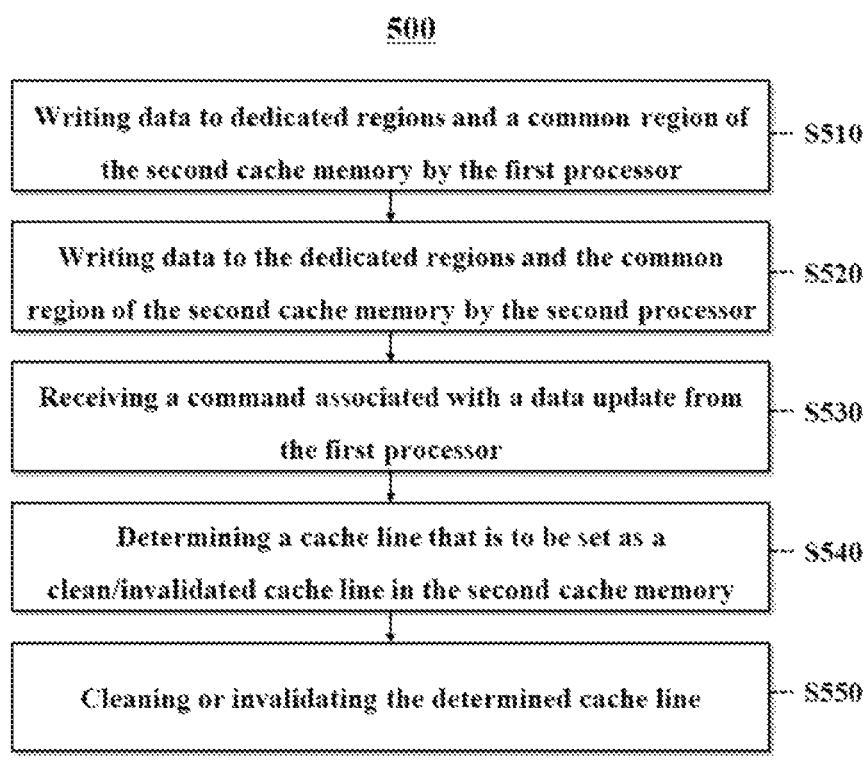
FIG. 5 is a flowchart illustrating a data management method in a multiprocessor system in accordance with one embodiment of the present disclosure.

FIG. 5 is a flowchart 500 illustrating a data management method in a multiprocessor system 100 in accordance with one embodiment of the present disclosure. In addition, FIG. 6 is a view 600 illustratively showing a process in which a command associated with a data update in a cache memory is processed according to the embodiment related to FIG. 5. According to one embodiment, the steps illustrated in FIG. 5 may be executed by the plurality of processors 110*a*, 110*b*, and 110*c* and the second cache controller 240.

According to one embodiment, the second cache memory 230 may include memory regions that can be used exclusively by a plurality of processors. For example, the second cache memory 230 may include a first memory region dedicated to a first processor and a second memory region dedicated to a second processor, which is different from the first memory region. In addition, the second cache memory 230 may include a memory region that can be used in common by a plurality of processors. For example, the second cache memory 230 may include a third memory region shared by the first processor and the second processor. As shown in FIG. 6, the second cache memory 230 may include a memory region A1 dedicated to the processor 110*a*, a memory region A2 dedicated to the processor 110*b*, and a memory region A3 shared by the processor 110*a* and the processor 110*b*.

Data may be written to the dedicated regions and the common region of the second cache memory 230 by the first processor (S510). In addition, data may be written to the dedicated regions and the common region of the second cache memory 230 by the second processor (S520). According to one embodiment, data may be written to the second cache memory 230 by requests associated with data accesses (e.g., write requests, read requests, etc.) of each of the processor 110*a* and the processor 110*b*. As shown in a first state 610 of FIG. 6, data are written to cache lines 601, 602, and 605 by the processor 110*a*, and data are written to cache lines 603, 604, and 606 by the processor 110*b*. The cache line 601 and the cache line 602 are included in the memory region A1 dedicated to the processor 110*a*, and the cache line 603 and the cache line 604 are included in the memory region A2 dedicated to the processor 110*b*. In addition, the cache line 605 and the cache line 606 are included in the memory region A3 shared by the processor 110*a* and the processor 110*b*. It is assumed that these cache lines 601 to 606 are set as dirty cache lines in the first state 610.

A command (or request) associated with a data update may be received from the first processor (S530). According to one embodiment, the processor 110*a* may issue a partial flush command or a partial invalidate command, which is a command associated with a data update. The first cache controller 220 of the first cache device 120*a* and/or the second cache controller 240 of the second cache device 130 may receive the command. The second cache controller 240 may process the command in the next step (S540). Although a specific description is omitted in this embodiment, the first cache controller 220 may process the command in the first cache memory 210.

A cache line to be set as a clean cache line or an invalidated cache line in the second cache memory 230 may be determined (S540). The second cache controller 240 may process the command associated with a data update from the processor 110*a*. According to one embodiment, if the command is a partial flush command, the second cache controller 240 may determine cache lines included in a memory region dedicated to the processor 110*a* and a memory region shared by the processor 110*a* with other processors as cache lines to be set as clean cache lines. In addition, if the command is a partial invalidate command, the second cache controller 240 may determine cache lines included in a memory region dedicated to the processor 110*a* and a memory region shared by the processor 110*a* with other processors as cache lines to be set as invalidated cache lines. At this time, the second cache controller 240 may determine not to change cache lines (i.e., not to set them as clean cache lines or invalidated cache lines) included in memory regions dedicated to processors other than the processor 110*a* that has transferred the command and a memory region shared among a plurality of other processors (e.g., processors 110*b* and 110*c*).

As shown in FIG. 6, the second cache controller 240 may receive a partial flush command 630 from the processor 110*a*. In response to the corresponding command 630, the second cache controller 240 may determine the cache lines 601 and 602 included in the memory region A1 dedicated to the processor 110*a* and the cache lines 605 and 606 included in the memory region A3 shared by the processor 110*a* with another processor 110*b* as cache lines to be set as clean cache lines. At this time, it may be determined not to set cache lines included in memory regions dedicated to other processors, such as the processor 110*b*, or in a memory region shared only by other processors as clean cache lines. For example, the second cache controller 240 may determine not to set as clean cache lines for the memory region dedicated to the processor 110*b*, the memory region dedicated to the processor 110*c*, and the memory region shared by the processor 110*b* and the processor 110*c*.

The second cache controller 240 may use various pieces of information shown in the first state 610, for example, region information and/or processor ID information, to determine cache lines in step S540. The second cache controller 240 may manage the various pieces of information shown in the first state 610 as a tag table and determine a cache line to be set as a clean cache line or an invalidated cache line by using the tag table.

The determined cache line may be set as a clean cache line or invalidated cache line (S540). According to one embodiment, the second cache controller 240 may set the cache line determined in step S530 as a clean cache line or an invalidated cache line. The second cache controller 240 may set the determined cache line as a clean cache line if the command in step 530 is a partial flush command, and set the determined cache line as an invalidated cache line if the command in step 530 is a partial invalidate command. As shown in FIG. 6, the cache lines 601, 602, 605, and 606 may be set as clean cache lines, and the other cache lines 603 and 604 may be kept as dirty cache lines. Through this processing, the second cache memory 230 may change from the first state 610 to a second state 620.

A second cache controller in accordance with a comparative example may receive a flush command or an invalidate command, and may process a global flush or global invalidation for a memory region shared among a plurality of processors in response to the command. Accordingly, the range of a memory region to which the flush command or the invalidate command is applied may be widened, causing unnecessary consumption of processing resources and delays in processing time, or cache misses even for unnecessary data.

On the other hand, the second cache controller 240 in accordance with the present disclosure may receive a flush command or an invalidate command from the processor, selectively set a cache line associated with the command out of the cache lines of the second cache memory 230 as a clean cache line or an invalidated cache line, and keep the rest of the cache lines as they are. In particular, the second cache controller 240 may not unconditionally process a global flush or global invalidation for a memory region shared by a plurality of processors. Instead, the second cache controller 240 may check by which processors the corresponding memory region is shared, and may selectively proceed with a partial flush or partial invalidation processing only for a memory region shared by processors associated with the command. With this characteristic configuration, the range of a memory region to which the flush command or the invalidate command is applied can get narrower relatively. Accordingly, it is possible to prevent unnecessary consumption of processing resources and delays in processing time due to additional flush processing, and prevent cache misses from occurring due to additional invalidation processing. As a result, the overall performance of the multiprocessor system 100 can be improved.

Figure 7:
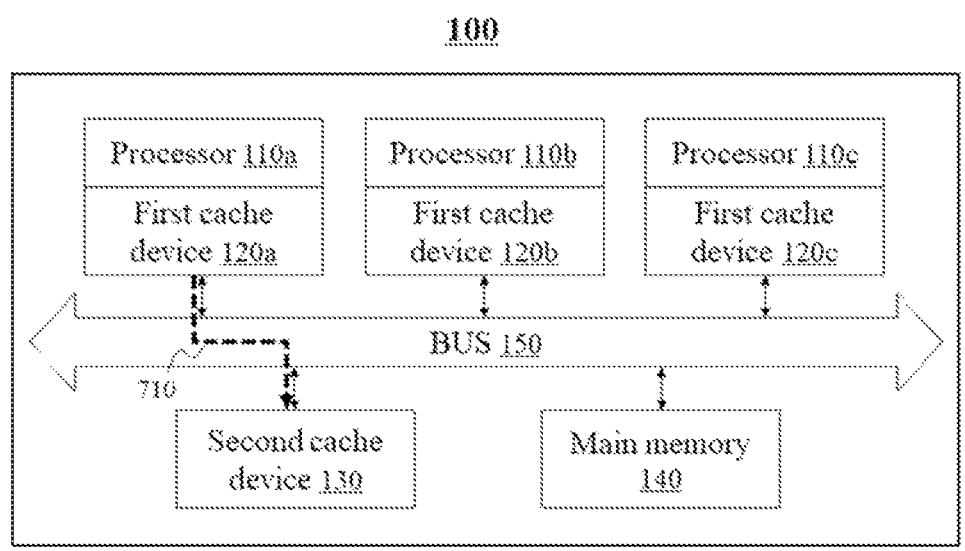
FIG. 7 is a diagram showing a method in which a data management method in accordance with one embodiment of the present disclosure is implemented on a bus.

FIG. 7 is a diagram showing a method in which a data management method in accordance with one embodiment of the present disclosure is implemented on a bus 150.

In the multiprocessor system 100 in accordance with the present disclosure, a data management method may be executed using an Advanced extensible Interface (AXI) protocol of the Advanced Microcontroller Bus Architecture (AMBA) specification. According to the present disclosure, each of the plurality of processors may transfer a signal indicating the ID of the processor according to the AXI protocol when writing data to the second cache memory 230. According to one embodiment, the processor 110a may transfer an AXI signal 710 indicating the ID of the processor 110a to the second cache device 130 according to the AXI protocol when writing data to the second cache memory 230 according to a read request or a write request. Likewise, the processor 110b may transfer an AXI signal 710 indicating the ID of the processor 110b to the second cache device 130 according to the AXI protocol when writing data to the second cache memory 230 according to a read request or a write request. For example, AXI AR user bits may be utilized as the AXI signal 710, for example. Alternatively, a method in which the ID of the corresponding processor is written to the ID of the AXI signal 710 may also be utilized.

The second cache controller 240 of the second cache device 130 may receive the AXI signal 710 from the processor via the bus 150. The second cache controller 240 may write the ID of the corresponding processor to the cache tag of the cache line to which the data is written based on the received AXI signal 710.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. A multiprocessor system comprising:
a plurality of processors including a first processor and a second processor;
a first cache memory configured to correspond to the first processor;
a second cache memory being at a level different from the first cache memory, corresponding to the first processor and the second processor, and configured to store a plurality of cache lines; and
a controller configured to manage data stored in the second cache memory,
wherein the second cache memory comprises at least one first cache line in which data is written by the first processor and at least one second cache line in which data is written by the second processor, and
wherein the controller is further configured to:
receive a command associated with a data update from the first processor, and
in response to the command, set the at least one first cache line as a clean cache line or an invalidated cache line while not setting the at least one second cache line as a clean cache line or an invalidated cache line,
wherein the controller is further configured to, in response to the command, selectively set a cache line, in which a first identifier (ID) of the first processor is written to a cache tag, out of a plurality of cache lines of the second cache memory as a clean cache line or an invalidated cache line,
wherein the controller is further configured to receive a signal indicating an ID of a processor that writes data to the second cache memory according to an Advanced extensible Interface (AXI) protocol from any one of the plurality of processors.

2. The multiprocessor system of claim 1, wherein the command associated with the data update is a partial flush command or a partial invalidate command.

3. The multiprocessor system of claim 2, wherein the command associated with the data update is the partial flush command, and
the controller is further configured to:
in response to the partial flush command, set the at least one first cache line as a clean cache line while not setting the at least one second cache line as a clean cache line.

4. The multiprocessor system of claim 2, wherein the command associated with the data update is the partial invalidate command, and
the controller is further configured to:
in response to the partial invalidate command, set the at least one first cache line as an invalidated cache line while not setting the at least one second cache line as an invalidated cache line.

5. The multiprocessor system of claim 1, wherein the controller is further configured to:
write the first ID of the first processor to a cache tag of the at least one first cache line, and
write a second ID of the second processor to a cache tag of the at least one second cache line.

6. The multiprocessor system of claim 1, wherein the second cache memory comprises:
a first memory region dedicated to the first processor; and
a second memory region dedicated to the second processor, which is different from the first memory region, and
wherein the at least one first cache line is included in the first memory region, and
wherein the at least one second cache line is included in the second memory region.

7. The multiprocessor system of claim 6, wherein the second cache memory further comprises a third memory region shared by the first processor and the second processor,
the third memory region comprises at least one third cache line to which data is written by the first processor and at least one fourth cache line to which data is written by the second processor, and
wherein the controller is further configured to:
in response to the command associated with the data update, set the at least one third cache line and the at least one fourth cache line as clean cache lines or invalidated cache lines.

8. The multiprocessor system of claim 1, wherein the controller is further configured to:
manage a tag table in which a cache tag for each of the plurality of cache lines of the second cache memory is written, and
based on the tag table, determine one or more cache lines, which are to be set as clean cache lines or invalidated cache lines, according to the command from the first processor.

9. A data management method for a system comprising a first processor, a second processor, a first cache memory configured to correspond to the first processor, and a second cache memory being at a level different from the first cache memory and corresponding to the first processor and the second processor, the data management method comprising:
writing data to a first cache line of the second cache memory by the first processor;
writing data to a second cache line of the second cache memory by the second processor;
receiving a command associated with a data update from the first processor;
in response to the command, setting the first cache line as a clean cache line or an invalidated cache line while not setting the second cache line as a clean cache line or an invalidated cache line; and
determining one or more cache lines, which are to be set as clean cache lines or invalidated cache lines, according to the command from the first processor, based on a tag table in which a cache tag for each of a plurality of cache lines of the second cache memory is written,
wherein the writing the data to the first cache line comprises receiving a first signal indicating a first identifier (ID) of the first processor from the first processor according to an Advanced extensible Interface (AXI) protocol, and
wherein the writing the data to the second cache line comprises receiving a second signal indicating a second ID of the second processor from the second processor according to the AXI protocol.

10. The data management method of claim 9, wherein the command associated with the data update is a partial flush command or a partial invalidate command.

11. The data management method of claim 9, wherein the writing the data to the first cache line comprises writing the first ID of the first processor to a cache tag of the first cache line; and
the writing the data to the second cache line comprises writing the second ID of the second processor to a cache tag of the second cache line.

12. The data management method of claim 9, wherein the setting of the first cache line as the clean cache line or the invalidated cache line while not setting the second cache line as the clean cache line or the invalidated cache line comprises:
    selectively setting a cache line, in which the first ID of the first processor is written to a cache tag, out of a plurality of cache lines of the second cache memory as a clean cache line or an invalidated cache line.

13. The data management method of claim 9, wherein the second cache memory comprises:
    a first memory region dedicated to the first processor; and
    a second memory region dedicated to the second processor, which is different from the first memory region, and
    wherein the first cache line is included in the first memory region, and
    wherein the second cache line is included in the second memory region.

14. The data management method of claim 13, wherein the second cache memory further comprises a third memory region shared by the first processor and the second processor,
    the third memory region comprises at least one third cache line to which data is written by the first processor and at least one fourth cache line to which data is written by the second processor, and
    the data management method further comprising:
        in response to the command associated with the data update, setting the at least one third cache line and the at least one fourth cache line as clean cache lines or invalidated cache lines.

15. A data management method for a system comprising a first processor, a second processor, a first cache memory configured to correspond to the first processor, and a second cache memory being at a level different from the first cache memory and corresponding to the first processor and the second processor, the data management method comprising:
    writing data to a first cache line of the second cache memory by the first processor;
    writing data to a second cache line of the second cache memory by the second processor;
    receiving a command associated with a data update from the first processor; and
    in response to the command, setting the first cache line as a clean cache line or an invalidated cache line while not setting the second cache line as a clean cache line or an invalidated cache line,
    wherein the second cache memory comprises a first memory region dedicated to the first processor, and a second memory region dedicated to the second processor, which is different from the first memory region,
    wherein the first cache line is included in the first memory region,
    wherein the second cache line is included in the second memory region,
    wherein the second cache memory further comprises a third memory region shared by the first processor and the second processor,
    wherein the third memory region comprises at least one third cache line to which data is written by the first processor and at least one fourth cache line to which data is written by the second processor,
    wherein the data management method further comprises:
        in response to the command associated with the data update, setting the at least one third cache line and the at least one fourth cache line as clean cache lines or invalidated cache lines,
    wherein the writing the data to the first cache line comprises receiving a first signal indicating a first identifier (ID) of the first processor from the first processor according to an Advanced extensible Interface (AXI) protocol, and
    wherein the writing the data to the second cache line comprises receiving a second signal indicating a second ID of the second processor from the second processor according to the AXI protocol.

* * * * *